3,637,816
ACETATE DERIVATIVES OF 4-NITRO-1-HYDROXY OLEFINS AND PROCESS FOR THE PREPARATION THEREOF
Masao L. Honjoh and Stylianos Sifniades, Parsippany, N.J., assignors to Allied Chemical Corporation, New York, N.Y.
No Drawing. Filed Sept. 11, 1969, Ser. No. 857,195
Int. Cl. C07c 67/04, 69/14
U.S. Cl. 260—488 H
6 Claims

ABSTRACT OF THE DISCLOSURE

Compounds of the structure:

(I) 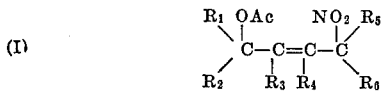

wherein $R_1$, $R_2$, $R_3$, $R_4$, $R_5$, and $R_6$ are independently hydrogen, a $C_1$ to $C_6$ alkyl radical, or a monocyclic or $C_1$ to $C_4$ alkyl-substituted aromatic moiety are readily prepared by reaction of acetyl nitrate with conjugated dienes of the structure:

(II) 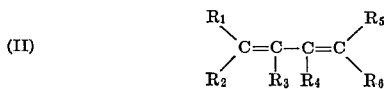

Compounds of structure (I) can be readily transformed into the corresponding aminoalkanol derivative.

BACKGROUND OF THE INVENTION

It is known that monoolefins react with acetyl nitrate

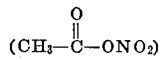

to form a mixture of products. See, for example, J. Am. Chem. Soc., 82, 3588 (1960); J. Org. Chem., 27, 3049 (1962); ibid, 28, 1765 (1963). Using n-butene as the monoolefin, the following product mixture was obtained:

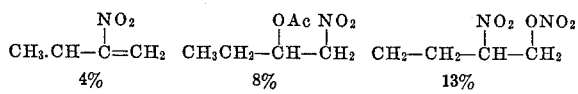

The reaction of conjugated dienes with acetyl nitrate has not, however, to the best of our knowledge, been reported or suggested anywhere. In view of the broad product mixture obtained using a monoolefin, it might be expected that an even greater variety of products would be obtained by nitration of a diene. We have found, however, in accordance with the instant invention, specific conditions under which the reaction of a conjugated diene of structure (II) with acetyl nitrate produces compound (I) in good yield.

(I) 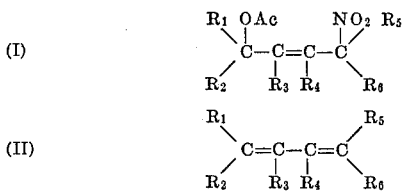

(II)

The nitrating agent is acetyl nitrate which is formed by the reaction of nitric acid with acetic anhydride.

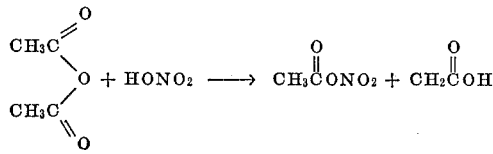

Since nitric acid is ordinarily obtained as an aqueous solution, when such nitric acid is mixed with acetic anhydride, it is necessary that at least sufficient acetic anhydride be present to react fully with both the water and the nitric acid. Preferably a concentrated (at least 50%) aqueous solution of nitric acid is utilized and an excess of acetic anhydride is used so that the mol ratio of acetic anhydride to nitric acid, after reaction with the water present in the nitric acid, ranges from about 2 to 1 to 10 to 1.

The preferred nitrating mixture will, therefore, contain acetyl nitrate, acetic acid and acetic anhydride.

The preferred nitration temperature range is from about −20° C. to +40° C., most preferably −5° C. to +20° C. Below −20° C., the rate of nitration of the diene is quite slow. Above about +40° C., by product formation and product decomposition results in decreased yields.

The time necessary for complete nitration of the diene depends upon the temperature of reaction, reactivity of the particular diene being nitrated, mol ratio of acetyl nitrate to diene, and on the presence of a strong acid nitration catalyst as will be more fully hereinafter described. Nitration is ordinarily complete in from ½ to 24 hours after mixing of the diene and acetyl nitrate.

The mol ratio of diene to acetyl nitrate is suitably from 1:1 to at least 10:1, preferably 1.2:1 to 3:1. Ratios below 1:1 result in the formation of a certain amount of undesired dinitrated product. Ratios above 10:1, although perfectly operable, have the disadvantage of significantly increasing recovery costs of the excess diene, which is ordinarily separated from the nitration mixture and recycled. The diene may be reacted either neat or dissolved in an inert solvent. Suitable solvents include acetic anhydride and $C_1$ or $C_2$ halogenated alkanes such as methylene chloride, chloroform, carbon tetrachloride, tetrachloroethane, and the like.

As heretofore indicated, the nitration reaction is preferably carried out in the presence of a strong acid catalyst. The amount of catalyst is suitably from about 0.1 to 5.0 mol percent based on acetyl nitrate, preferably 0.5 to 2.0 mol percent. Suitable acids include sulfuric, perchloric and hydrochloric, preferably sulfuric. Although the mode of addition of the reactants to each other is not critical, preferably the acetyl nitrate plus catalyst is added to the diene. The reaction is exothermic, and it may be necessary to cool the reaction mixture to maintain it within the desired temperature range. Preferably, all reactants are cooled at least below 0° C. prior to their mixing together.

Completion of the nitration reaction is most readily ascertained by noting the cessation of heat generation. As heretofore indicated, the reaction is exothermic. When no further heat of reaction is being generated, the reaction is complete.

The reaction mixture is generally worked up by adding sufficient water to destroy all acetic anhydride and any unreacted acetyl nitrate which may be present. The reaction mixture then contains water, acetic acid, product (I) any by-product, and generally, since an excess is used, diene (II) and possibly also a small amount of nitric acid. Further workup depends upon the volatility of the diene. If its boiling point is less than that of water, the excess diene can be stripped from the reaction mixture and then recycled. Product (I), which is always substantially less volatile than the parent diene and also less volatile than water, will, therefore, not be removed by the stripping. However, extraction of the stripped aqueous solution with a water-immiscible organic solvent such as halogenated $C_1$ or $C_2$ alkane or alkene, a $C_5$ to $C_8$ alkane or a $C_4$ to $C_8$ alkyl ether will remove the nitrated diene, i.e., product (I) and any by-product. This nitrated diene can be recovered from the extraction solvent and any other by-products present by fractional distillation. Alternatively, where the boiling point of the diene is approximately equal to or greater than that of water, the reaction mixture can be extracted after addition of water with a water-immiscible solvent as defined above to remove both unreacting diene and nitrated diene product. The excess diene and the nitrated diene can be separately recovered from the extraction solvent by fractional distillation.

Product (I) has a variety of utilities either as such e.g., as a fungicide or ascaricide or after further reaction. For example, the compounds of Formula I can be hydrogenated as with Raney nickel to form the substituted 1-amino-4-butanols:

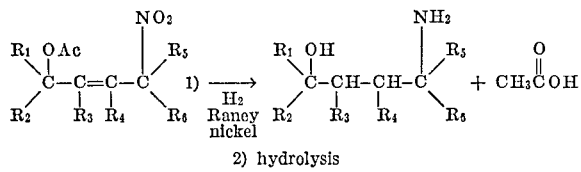

2) hydrolysis

These compounds can, in turn, be reacted with aliphatic or aromatic diacids to form polyester amides that possess some of the valuable properties of both polyamides (nylons) and polyesters.

The invention can be more fully understood by reference to the following examples. All parts are parts by weight unless otherwise expressly noted.

EXAMPLE 1

A solution of acetyl nitrate was prepared by adding 14.1 parts of 90% nitric acid into 100 parts acetic anhydride with cooling to keep the temperature at 15°–25° C. The mixture was kept at 20° C. for 10 minutes and then it was added within a period of 10 minutes to a cold solution of 61 parts 1,3-butadiene in 50 parts acetic anhydride. The diene solution temperature during addition was maintained at 0° C. The mixture was left for 19 hr. at 0° C., then it was poured into 500 parts ice water and stirred for 90 min. at room temperature in order to hydrolyze the excess acetic anhydride. At the same time, nitrogen was bubbled through the mixture in order to remove excess 1,3-butadiene. A heavy yellow oil was present in the aqueous solution. The aqueous solution was then extracted twice with 100 parts of chloroform, and the combined extracts were washed three times with 200 parts of water each time. Evaporation of solvent in vacuum left 26.9 parts of red-brown liquid product.

Analysis of the product by thin layer chromatography (TLC) showed the presence of two major components, A and B. A 1.67-gram aliquot of this crude product was refined by passing through a column packed with 50 grams silica gel using as eluent a cyclohexane/ethyl acetate/acetic acid 75:20:5 by volume. An 0.20 gram cut composed essentially of component (A) was obtained as a forecut and a 0.43 gram cut composed essentially of component B was obtained as bottoms. The nuclear resonance magnetic spectrum of component (B) had peaks at 5.96 p.p.m. (—CH=CH—); 4.92 p.p.m. (—CH$_2$NO$_2$); 4.55 p.p.m. (—CH$_2$OAc); and 2.04 p.p.m. (—OCOCH$_3$). The infrared spectrum of component (B) indicated the presence of an ester group (5.72 and 8.13 microns); aliphatic nitro group (6.42 microns); and olefinic bond (6.10 and 10.28 microns).

Elemental analysis of component (B) was consistent with a compound formed by addition of 1 mol acetyl nitrate to 1 mole 1,3-butadiene. These analytical results indicate that component (B) is 1-acetoxy-4-nitrobut-2-ene.

Elemental analysis and infrared red and nuclear magnetic resonance spectra indicated that component (A) is 1-nitro-2-acetoxy butene.

EXAMPLE 2

A solution of acetyl nitrate was prepared by adding 14.1 parts of 90% nitric acid into 100 parts acetic anhydride while keeping the temperature at 25°–30° C. To the solution, 0.5 part concentrated sulfuric acid was added, and the resulting mixture was added within 20 minutes to a solution of 54.6 parts of 1,3-butadiene in 50 parts acetic anhydride keeping the temperature at about —5° C. The mixture was left standing for 30 more minutes at 0° C., then it was poured into a solution of 10 parts of urea in 500 parts of water. After decomposition of excess acetic anhydride and removal of 1,3-butadiene by blowing with nitrogen, extraction with chloroform and evaporation of the chloroform gave 19.5 parts of yellow liquid product. This crude product was refined for identification as follows: A series of 1.5-gram aliquots was passed though a 50-gram silica gel column using as eluent a mixture of cyclohexane/ethyl acetate/acetic acid 75:20:5 by volume. In this way, a total of 3.20 gram of crude product was refined, yielding 0.80 gram of a component (A) and 1.48 gram of a component (B). Infrared and nuclear magnetic resonance spectra of the latter cut were consistent with the structure 1-acetoxy-4-nitrobut-2-ene.

There was dissolved in 10 parts acetic anhydride 0.090 part of component (B) and the mixture was hydrogenated for 16 hours over 0.40 part Raney nickel at 60° C. and 60 p.s.i. hydrogen pressure. The catalyst was filtered off and washed with ethyl acetate. The wash solvent and filtrate were combined and the solvent evaporated under vacuum. An oily residue (0.108 part) was left. The infrared spectrum of the residue was equivalent to that of a known sample of 1-amino-4-butanol.

EXAMPLE 3

A solution of acetyl nitrate was prepared by adding 14.1 parts of 90% nitric acid to 100 parts acetic anhydride while keeping the temperature at 15°–25° C. The mixture was kept at 20° C. for 10 minutes. It was then added within 25 min. to a solution of 22 parts 1,3-butadiene in 50 parts acetic anhydride. The temperature during the addition was maintained at about 15° C. The mixture was kept for 2½ hr. at 15° C.–17° C. It was then poured into 500 parts ice water. After hydrolysis of excess acetic anhydride and removal of excess 1,3-butadiene by blowing with nitrogen, extraction with chloroform and evaporation produced 24.2 parts of a yellow oil. Thin layer chomatography showed that this oil had essentially the same composition as the crude product obtained in Examples 1 and 2.

EXAMPLE 4

The following substituted dienes react with acetyl nitrate under the conditions of Example 1 to afford the corresponding compound of structure (I) which is recovered from the reaction mixture by extraction with diethyl ether, evaporation of the ether, and fractional distillation to separate the product (I) from the excess diene and nitration by-product.

| Diene | R$_1$ | R$_2$ | R$_3$ | R$_4$ | R$_5$ | R$_6$ |
|---|---|---|---|---|---|---|
| 1 | H | Phenyl | H | H | H | Phenyl |
| 2 | H | Methyl | H | H | H | Methyl |
| 3 | H | H | Methyl | Methyl | H | H |
| 4 | H | H | Phenyl | Phenyl | H | H |
| 5 | p-Tolyl | H | H | H | H | H |
| 6 | n-Propyl | H | H | H | n-Propyl | H |

We claim:
1. A compound of the structure

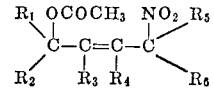

wherein R$_1$, R$_2$, R$_3$, R$_4$, R$_5$ and R$_6$ are independently hydrogen, a C$_1$ to C$_6$ alkyl radical, or a phenyl or C$_1$ to C$_4$ alkyl-substituted phenyl radical.

2. A compound in accordance with claim 1 wherein R$_1$, R$_2$, R$_3$, R$_4$, R$_5$ and R$_6$ are independently hydrogen, phenyl or methyl.

3. 1-acetoxy-4-nitrobut-2-ene.

4. A process for producing the compound of claim 1 which comprises reacting a conjugated diene of the structure

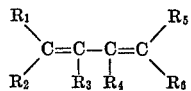

wherein $R_1$, $R_2$, $R_3$, $R_4$, $R_5$ and $R_6$ are as defined in claim 1 with up to an equimolar amount of acetyl nitrate at a temperature of $-20°$ C. to $+40°$ C.

5. A process in accordance with claim 4 wherein said reaction is carried out in the presence of from 0.1 to 5.0 mol percent based on acetyl nitrate of sulfuric, perchloric or hydrochloric acid.

6. A process in accordance with claim 5 wherein said acid is sulfuric.

References Cited
UNITED STATES PATENTS 3,404,176  10/1968  Burton et al. _____ 260—497

OTHER REFERENCES

Chemical Abstracts, 60:1571f.
J. Am. Chem. Soc., 82, 3588 (1960).
J. Org. Chem., 27, 3049 (1962).
J. Org. Chem., 28, 1765 (1963).

LORRAINE A. WEINBERGER, Primary Examiner

V. GARNER, Assistant Examiner

U.S. Cl. X.R.

260—488 CD, 584 R, 999